(12) United States Patent
Alperin et al.

(10) Patent No.: US 7,139,169 B2
(45) Date of Patent: Nov. 21, 2006

(54) SYSTEM AND METHOD FOR INFORMATION HANDLING SYSTEM COOLING FAN OPERATING PARAMETER SELECTION

(75) Inventors: Joshua N. Alperin, Round Rock, TX (US); Ajay Kwatra, Austin, TX (US); James Shields, Cedar Park, TX (US); Benjamen G. Tyner, Norman, OK (US)

(73) Assignee: Dell Products L.P., Round Rock, TX (US)

( * ) Notice: Subject to any disclaimer, the term of this patent is extended or adjusted under 35 U.S.C. 154(b) by 444 days.

(21) Appl. No.: 10/733,910

(22) Filed: Dec. 11, 2003

(65) Prior Publication Data

US 2005/0128700 A1 Jun. 16, 2005

(51) Int. Cl.
*G06F 1/20* (2006.01)
*G06F 19/00* (2006.01)
*H05K 7/20* (2006.01)
*G05B 11/01* (2006.01)
*G05D 23/00* (2006.01)

(52) U.S. Cl. .................. 361/687; 361/695; 702/99; 700/25; 700/299

(58) Field of Classification Search .............. 700/25, 700/275, 276, 278, 299, 300; 361/687, 688, 361/695; 702/99; 713/300, 340, 320, 322
See application file for complete search history.

(56) References Cited

U.S. PATENT DOCUMENTS

| | | | | |
|---|---|---|---|---|
| 5,039,009 A | * | 8/1991 | Baldwin et al. | 236/51 |
| 5,568,732 A | * | 10/1996 | Isshiki et al. | 62/129 |
| 5,758,607 A | * | 6/1998 | Brendel et al. | 123/41.1 |
| 5,926,386 A | * | 7/1999 | Ott et al. | 700/70 |
| 6,082,623 A | * | 7/2000 | Chang | 236/49.3 |
| 6,155,341 A | * | 12/2000 | Thompson et al. | 165/244 |
| 6,247,898 B1 | | 6/2001 | Henderson et al. | 417/3 |
| 6,283,380 B1 | * | 9/2001 | Nakanishi et al. | 236/49.3 |
| 6,526,333 B1 | | 2/2003 | Henderson et al. | 700/300 |
| 6,601,168 B1 | | 7/2003 | Stancil et al. | 713/100 |
| 6,643,128 B1 | | 11/2003 | Chu et al. | 361/687 |
| 6,927,978 B1 | * | 8/2005 | Arai et al. | 361/695 |
| 6,977,587 B1 | * | 12/2005 | Pradhan et al. | 340/539.26 |
| 6,977,812 B1 | * | 12/2005 | Sasaki | 361/687 |
| 2005/0244263 A1 | * | 11/2005 | Hardt et al. | 415/47 |
| 2006/0016901 A1 | * | 1/2006 | Beitelmal et al. | 236/49.3 |

* cited by examiner

*Primary Examiner*—Crystal J. Barnes
(74) *Attorney, Agent, or Firm*—Hamilton & Terrile, LLP; Robert W. Holland

(57) ABSTRACT

An information handling system cooling fan operating curve is automatically selected for use by a cooling fan controller by detecting the configuration of the information handling system and looking up cooling fan operating parameters from a table associated with the information handling system. For instance, central processing unit identification information is used to select associated cooling fan operating parameters so that adequate cooling is available to meet system cooling constraints for the heat characteristics of the central processing unit with reduced acoustic impact associated with operation of the information handling system.

22 Claims, 2 Drawing Sheets

SYSTEM AND METHOD FOR INFORMATION HANDLING SYSTEM COOLING FAN OPERATING PARAMETER SELECTION

BACKGROUND OF THE INVENTION

1. Field of the Invention

The present invention relates in general to the field of information handling system cooling, and more particularly to a system and method for information handling system cooling fan operating curve selection.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems have adapted over time to handle an increasing number of tasks with processors and other components that operate at increased cycles to perform increased numbers of calculations in reduced time. One problem that arises with more powerful processing components is that such components tend to create increased amounts of excess heat. In order to ensure proper operation of the components, information handling systems typically incorporate cooling equipment, such as a cooling fan that maintains a flow of external air through the information handling system chassis and over the processing components. To maintain adequate cooling airflow, information handling system manufacturers generally layout components within the chassis to effectively transfer excess heat while also attempting to meet other design constraints, such as reduced acoustics, cooling component costs and complexity at assembly. Thus, for example, as new processors are released with different heat generation characteristics, manufacturers face new design challenges to ensure that cooling requirements for the processor are met. To meet these challenges, manufacturers typically adapt cooling fan performance characteristics and chassis airflow characteristics for each information handling system configuration. However, changing these characteristics for each new processor is an expensive proposition, especially where other constraints are impacted, such as acoustic constraints, shock and vibration constraints and chassis component specifications.

Generally, information handling system manufacturers make design tradeoffs that plan within current designs the flexibility to adapt cooling subsystems for use with future processor revisions and speeds. This tends to have negative cost and acoustic impact on existing designs since the possible thermal limits of to-be-developed processors are unknown. For instance, thermistor-based fan controllers sense the temperature within an information handling system chassis to adjust fan speed and thus maintain the temperature within defined constraints. As another example, intelligent fan controllers include an integrated circuit that determines fan speed through a number of inputs such as processor temperature, chassis temperature, fan RPM, and other sensors. Where such closed-loop cooling systems seek to maintain thermal conditions that differ from the thermal conditions desired for a given information handling system configuration, suboptimal processing and acoustic performance often results.

SUMMARY OF THE INVENTION

Therefore a need has arisen for a system and method which dynamically selects cooling system parameters based on an information handling system configuration.

In accordance with the present invention, a system and method are provided which substantially reduce the disadvantages and problems associated with previous methods and systems for managing information handling system operating temperature. A cooling system controller uses cooling system parameters to set cooling system performance based on an information handling system configuration, such as the heat generation characteristics of a CPU identified on the information handling system.

More specifically, an operating curve selector configures an operating fan controller with cooling system parameters to maintain a cooling fan operating curve on an information handling system. The cooling system parameters are stored in a cooling system parameter table on the information handling system, such as in firmware, by correlating one or more cooling system parameters to one or more components. The operating curve selector identifies the predetermined components by an identification code and looks-up the cooling system parameters from the table that are associated with the identified components. For instance, a CPU identification code establishes minimum and maximum temperatures for the associated CPU along with correlating fan speed settings for sensed temperatures with that operating range. As another example, an identification code associated with a chassis or chassis component, such as a cooling shroud, establishes fan operating speed ranges in combination with CPU type identification. An update module provides updated cooling system parameters from a remote location for either periodically updating the table or when a look-up results in an identification code not recognized by the table. Selectable cooling fan operating curves aid in manufacture by adapting a given cooling fan system for optimal acoustics with a variety of information handling system configurations, including a variety of CPU and chassis types.

The present invention provides a number of important technical advantages. One example of an important technical advantage is that cooling fan operations adjust to adapt to different information handling system configurations to provide optimal cooling and acoustic performance. Dynamic selection of cooling fan performance curve parameters based on processor and chassis identification automatically adjusts cooling systems as appropriate at system manufacture to reduce cooling system design costs and assembly. Dynamic selection in deployed systems adjusts cooling fan performance in the event of changes to information handling system configuration, such as replacement of a system's processor. Cooling fan performance parameters are updated in deployed systems through network or other interfaces as new processors or other configuration factors are released so that cooling constraints are met regardless of the availability of associated parameters at initial manufacture of an information handling system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A cooling fan operating curve for a cooling fan to use to cool an information handling system is selected from operating curves stored on the information handling system with the selection based on a detected configuration of the information handling system, such as the CPU type. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
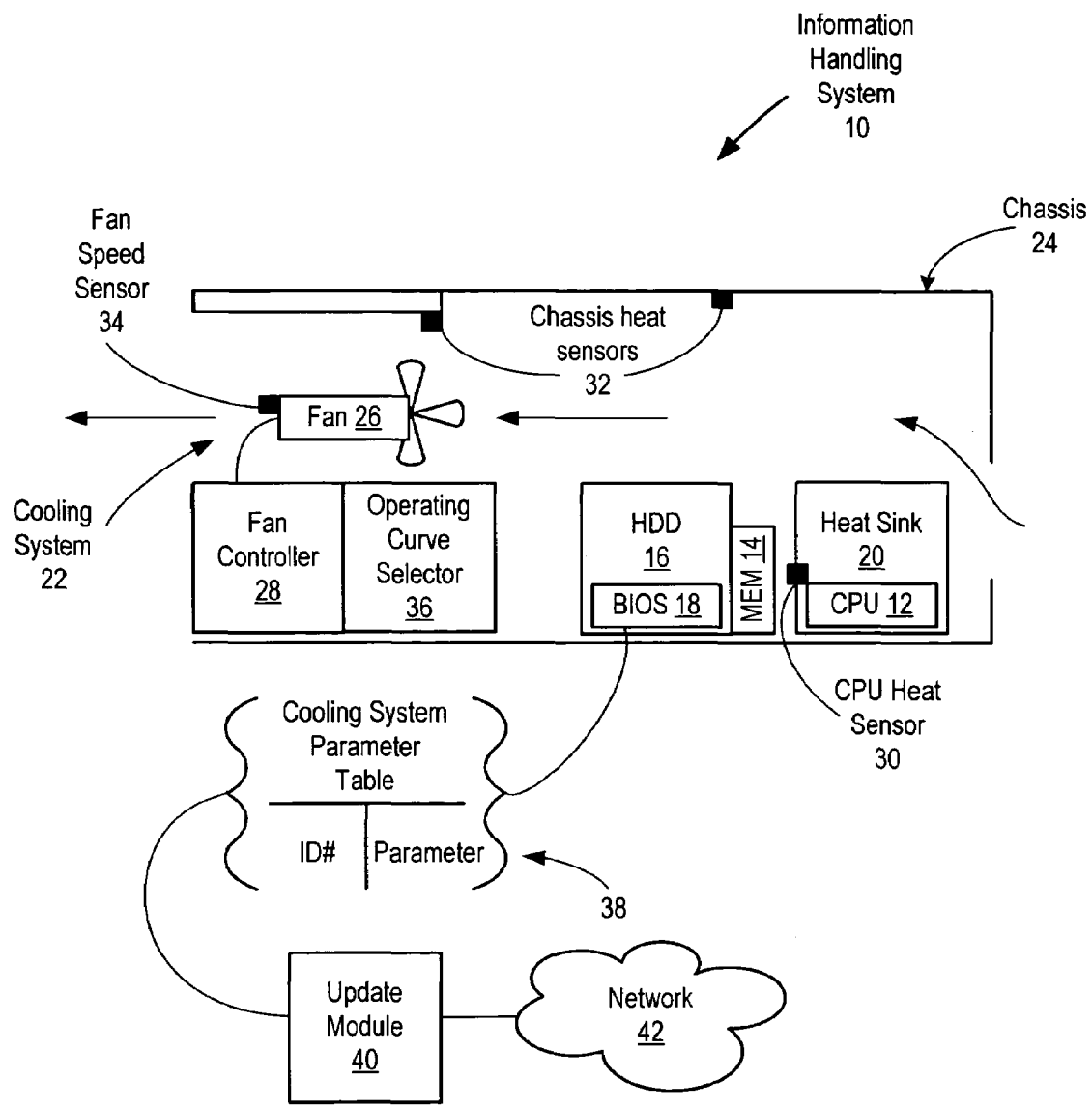
FIG. 1 depicts a side cutaway view of an information handling system having a selectable cooling fan operating curve.

Referring now to FIG. 1, a side cutaway view depicts an information handling system 10 that selects a cooling fan operating curve based on the configuration of one or more components of the information handling system 10. Components that process information for information handling system 10 include a CPU 12, memory 14, a hard disk drive 16 and basic input output system (BIOS) 18. Although each of these components generate excess heat during operation of information handling system 10, CPU 12 generally produces the greatest amount of excess heat. A heat sink 20 located over CPU 12 aids in removal of excess heat by extending into a cooling airflow and offering a greater surface area for heat transfer. The cooling airflow is provided by a cooling system 22 that draws air from the exterior and through the interior of a chassis 24 that houses the components. The nature of the cooling airflow depends upon the path provided for the airflow through chassis 24 with the efficiency of heat transfer and acoustics effected by the size and shape of chassis 24 as well as the presence of air shrouds or other devices to help direct the airflow.

Cooling system 22 is a fan 26 aligned to flow air through the interior of chassis 24 at variable speeds determined by a fan controller 28. Operation of fan 26 at slower speeds reduces heat transfer and acoustics so that information handling system 10 runs more quietly but at higher temperatures. Operation of fan 26 at higher speeds increases heat transfer and acoustics so that information handling system 10 runs more loudly but at lower temperatures. Fan controller 28 selects fan operating speed based on feedback control to maintain a desired fan operating curve versus sensed cooling system performance. Cooling system performance is measured through sensors, such as a processor edge diode temperature provided by a CPU heat sensor 30, chassis temperature provided by chassis heat sensors 32, fan operating speed provided by a fan speed sensor 34, and other cooling system performance sensors. Cooling system parameters within fan controller 28 establish a desired operating environment within which components of the information handling system are designed to operate. For instance, different central processing units have temperature operating ranges that vary in their upper and lower constraints as well as their range.

Fan controller 28 has an operating curve selector 36 that automatically adapts cooling system parameters to maintain cooling system performance within an operating range associated with components of information handling system 10. Operating curve selector 36 communicates with BIOS 18 to obtain the identity of selected components and looks-up the components in a cooling system parameter table 38. For instance, cooling system parameters are correlated by CPU type, chassis type or a combination of both factors. Operating curve selector 36 configures fan controller 28 to apply the cooling system parameters for recognized components so that temperature constraints for the components are met without excessive acoustics. In the event that an unrecognized component is identified that is not found in cooling system parameter table 38, a default operating curve is selected that increases cooling capacity at the expense of acoustics in order to reduce the risk of thermal failure. In one embodiment, an update module 40 interfaces with a network 42 to locate unrecognized component cooling system parameters from a remote location, such as a manufacturer web site. Update module aids manufacture of information handling systems by adapting a given cooling system for use with a variety of information handling system configurations and also helps to ensure that future modifications made by a consumer, such as replacement of a cooler-operating CPU with a hotter-operating CPU will not lead to thermal failure. In an alternative embodiment, operating curve selector 36 calculates an operating curve by applying mathematical models of desired cooling to processor thermal characteristics. Calculating of operating curves on board the information handling system from processor thermal characteristics reduces the need for transfer and storage of numerous operating curves for various chassis configurations.

Figure 2:
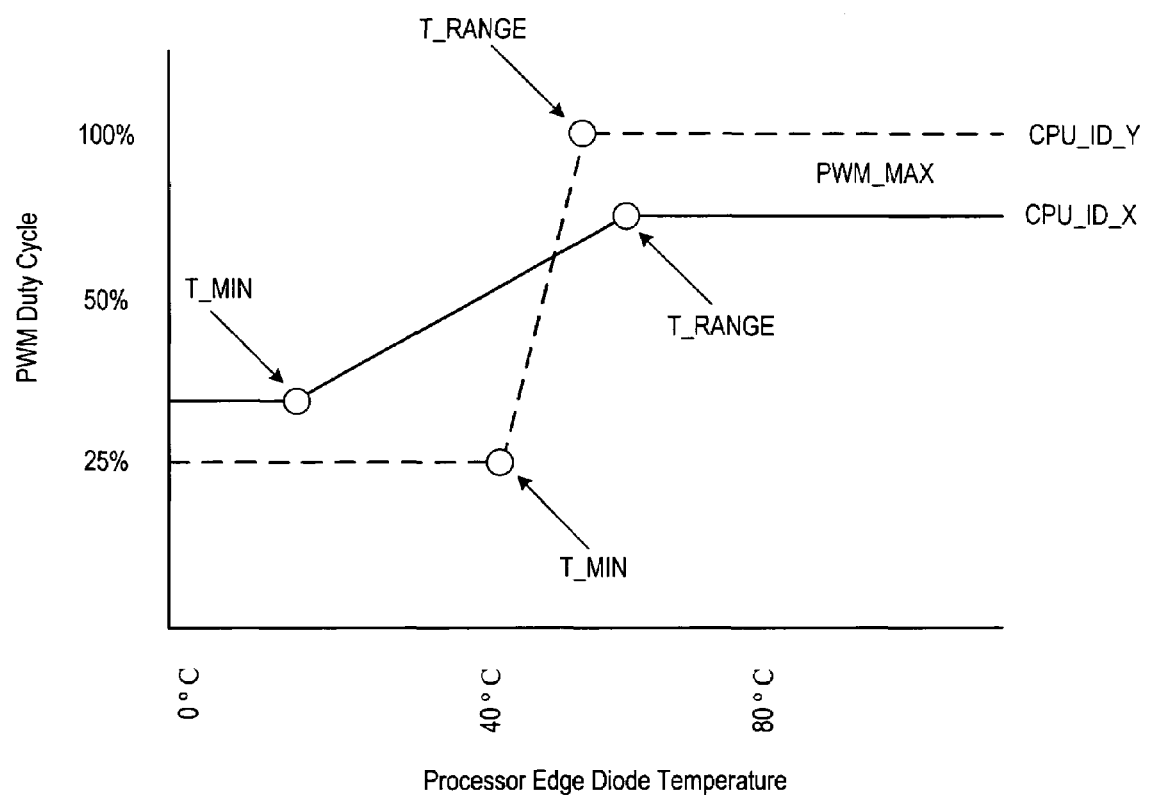
FIG. 2 depicts one example of cooling fan operating curves.

Referring now to FIG. 2, a graph depicts an example of cooling fan operating curves created from cooling system parameters. The solid line is an operating curve for a cooling fan configured to cool a CPU with the identification code CPU_ID_X. The dotted line is an operating curve for a cooling fan configured to cool a CPU with the identification code CPU_ID_Y. Each operating curve has a PWM_MIN that defines the operating duty cycle of the cooling fan when the sensed processor edge diode temperature is less than a temperature of T_MIN. Each operating curve has a PWM_MAX that defines the operating duty cycle of the cooling fan when the sensed processor edge diode temperature is greater than a temperature of T_RANGE. The cooling fan operating duty cycle between T_MIN and T_RANGE is set by a linear relationship. As illustrated by FIG. 2, the X CPU has a larger temperature range that requires smaller step increases of cooling fan duty cycle. In comparison, the Y CPU has a smaller temperature range that requires greater step increases of cooling fan duty cycle. Thus, selection of the CPU_ID_Y curve where an information handling system is configured with a Y CPU results in reduced acoustics in the lower temperature range while selection of the CPU_ID_X curve where an information handling system is configured with a X CPU results in reduced acoustics in the higher temperature range. If the cooling fan had to adapt to either CPU, then, in order to ensure adequate thermal capability, the greater of the two duty cycles at each temperature would have to be used resulting in excess acoustics for each type of CPU at some point in each operating temperature range.

Although the present invention has been described in detail, it should be understood that various changes, substitutions and alterations can be made hereto without departing from the spirit and scope of the invention as defined by the appended claims.

What is claimed is:

1. An information handling system comprising:
   plural components operable to process information, one or more of the components having an identification code;
   a chassis having an exterior and interior, the interior housing the plural components;
   a cooling system associated with the chassis and operable to cool the components;
   one or more sensors operable to sense cooling system performance;
   a cooling system controller interfaced with the cooling system and the sensor, the cooling system controller operable to adjust cooling system performance according to one or more cooling system parameters; and
   a cooling system parameter table interfaced with the cooling system controller and having plural cooling parameters, each cooling parameter associated with one or more component identification codes;
   wherein the cooling system controller is further operable to select one or more cooling parameters for adjusting cooling system performance, the selection by lookup of the component identification code from the cooling system parameter table.

2. The information handling system of claim 1 wherein the component comprises a central processing unit and the component identification code comprises a central processing unit identification code.

3. The information handling system of claim 1 wherein the component comprises a basic input output system and the component identification code comprises a chassis identification code.

4. The information handling system of claim 1 wherein the cooling system comprises a fan aligned to exchanged heated air from the chassis interior with cooling air from the chassis exterior.

5. The information handling system of claim 4 wherein the cooling system parameter comprises cooling fan speed.

6. The information handling system of claim 4 wherein the cooling system parameter comprises the temperature in the chassis interior.

7. The information handling system of claim 4 wherein the cooling system parameter comprises an operating curve defining cooling fan speeds in relation to sensed temperatures.

8. The information handling system of claim 1 further comprising an update module interfaced with the cooling system parameter table and operable to update the cooling system parameter table with updated component identification codes and associated cooling system parameters.

9. The information handling system of claim 1 wherein the cooling system parameter table comprises a default cooling system parameter for use with unknown component identification codes.

10. The information handling system of claim 1 wherein the cooling system parameter comprises a central processor unit edge diode temperature.

11. A method for managing information handling system temperature control, the method comprising:
    detecting a configuration of the information handling system, the configuration comprising at least one component, the component having an identification code;
    looking up cooling system parameters associated with the component identification code from a table stored on the information handling system;
    configuring a cooling system of the information handling system with the cooling system parameters; and
    managing the temperature of the information handling system with the cooling system.

12. The method of claim 11 wherein detecting a configuration further comprises detecting a central processing unit identification code.

13. The method of claim 11 wherein detecting a configuration further comprises detecting a chassis identification code.

14. The method of claim 11 wherein looking up cooling system parameters further comprises retrieving cooling system parameters associated with an identification code of a component of the information handling system from a table stored in the basic input output system of the information handling system.

15. The method of claim 14 further comprising:
    downloading updated table information to the information handling system, the updated table information having one or more updated components, the updated component having associated updated cooling system parameters;
    detecting a change to the configuration of the information handling system with an updated component; and
    configuring the cooling system with the associated updated cooling system parameters.

16. The method of claim 11 wherein configuring a cooling system further comprises:
    loading a fan controller with cooling system parameters to operate the fan within a performance curve correlating sensed temperatures and fan speed.

17. The method of claim 16 wherein the sensed temperature comprises a processor edge diode temperature.

18. A system for cooling an information handling system, the system comprising:
    a cooling fan operable to couple to an information handling system aligned to provide cooling air for cooling one or more components of the information handling system;

a fan controller interfaced with the cooling fan and operable to obtain temperature information associated with the information handling system and to control cooling fan speed according to an operating curve; and an operating curve selector interfaced with the fan controller and operable to obtain component identification information from the one or more components and to select an operating curve associated with the component identification information for use by the fan controller.

19. The system of claim 18 wherein the component comprises a central processing unit.

20. The system of claim 18 wherein the component comprises a chassis.

21. The system of claim 18 further comprising an operating curve look-up table having plural operating curves, each operating curve associated with one or more sets of component identification information.

22. The system of claim 18 wherein the operating curve selector is further operable to calculate an operating curve from thermal characteristics associated with the identified components.

* * * * *